Jan. 16, 1968     G. ALTMAN     3,363,506
OVERHEAD PROJECTOR
Filed Dec. 9, 1965
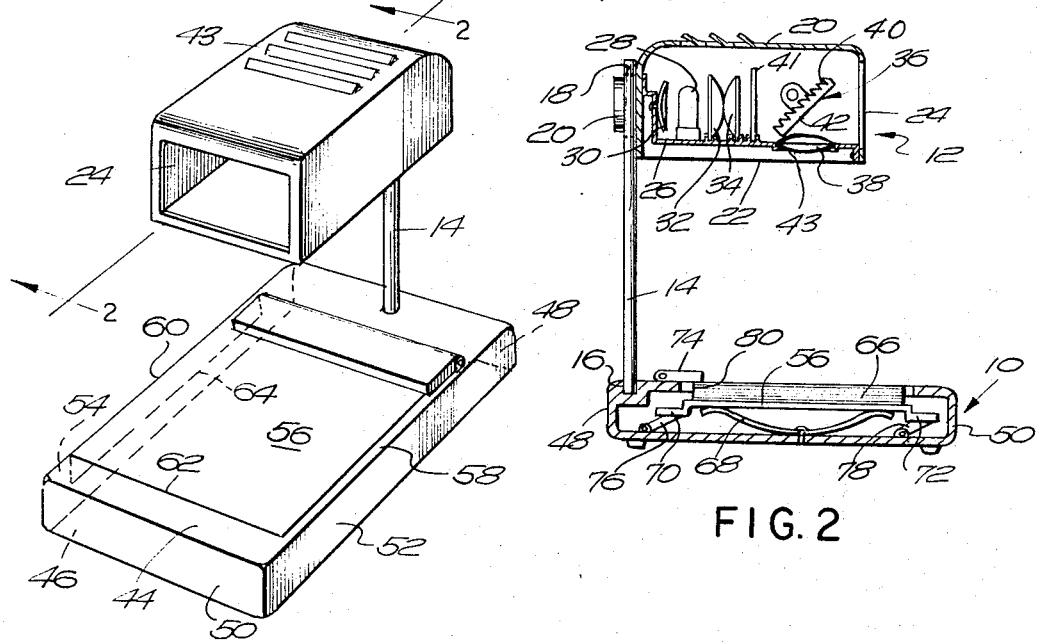
FIG. 1
FIG. 2
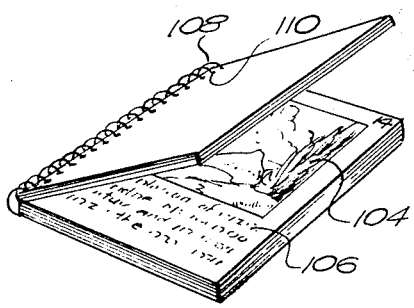
FIG. 4
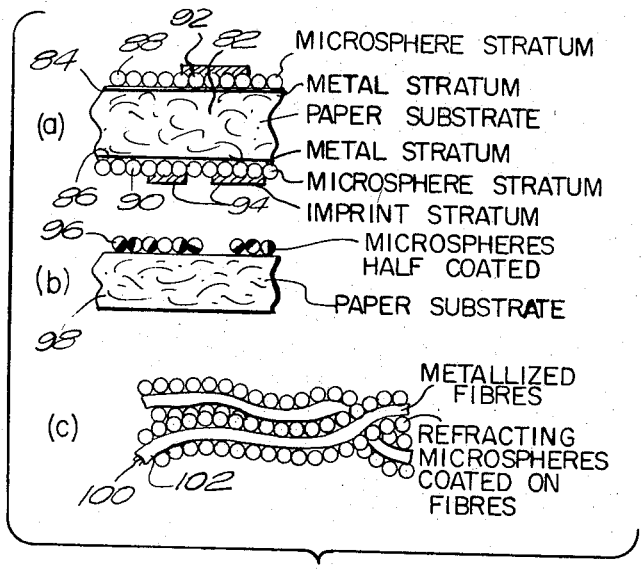
FIG. 3
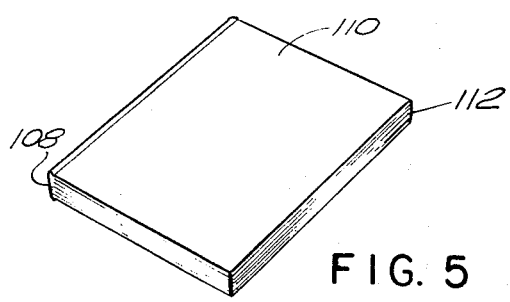
FIG. 5
INVENTOR.
Gerald Altman
BY
Morse, Altman + Oates
ATTORNEYS 3,363,506
OVERHEAD PROJECTOR
Gerald Altman, 41 Westminster Road,
Newton Center, Mass. 02159
Continuation-in-part of application Ser. No. 249,351,
Jan. 4, 1963, and Ser. No. 349,853, Mar. 6, 1964.
This application Dec. 9, 1965, Ser. No. 512,715
7 Claims. (Cl. 88—24)

ABSTRACT OF THE DISCLOSURE

An overhead projector is provided with lamp and lens components carried in an upper casing for cooperation with a directive reflector on a lower base. A transmitting reflecting means in the casing directs light to the base and receives light from the base substantially along the same axis for deflection toward a viewing screen.

Background and brief description

The present invention relates to optical projection and, more particularly, to a novel so-called overhead projector for graphic subjects of sufficiently large size to be handled, viewed and marked during projection. In prior projectors of the foregoing type, handling, viewing and marking have involved various difficulties. Thus, typically the source of illumination for projecting transparent copy is a large light box which may be unwieldy. And, typically the housing for opaque copy is fully enclosed so that manipulation and marking are inconvenient.

The present invention is a continuation-in-part of: U.S. patent application Ser. No. 249,351, filed Jan. 4, 1963, in the name of the applicant hereof for Optical Products, Processes and Devices, now U.S. Patent No. 3,269,839; and U.S. patent application Ser. No. 349,853, filed Mar. 6, 1964 in the name of the applicant hereof for System of Optical Projection of Images by Reflex Reflected Illumination, now U.S. Patent No. 3,222,986.

A primary object of the present invention is the provision of an overhead projector in which the housing comprises a lower platform of restricted vertical dimension, an upper casing for an illumination and optical system characterized by a transmitting-reflecting means, and a post for supporting the casing above the platform a sufficient distance to provide manual and visual accessibility, so that substantially a single axis is established for light transmitted to and returned from; a directive reflector on the platform.

The overhead projector of the present invention is, for example, adapted for use with novel opaque copy in the form of a booklet or the like comprising a plurality of opaque sheets bound along one edge and having a reflex reflecting stratum by which a representation associated therewith may be projected to a viewing screen by the optical system in the casing. In one form each such sheet incorporates a multiplicity of refracting microspheres in association with felted cellulosic fibers of a paper sheet.

Other objects of the present invention will in part be obvious and will in part appear hereinafter.

The invention accordingly comprises the devices and products comprising the parts and components, which are exemplified in the following detailed disclosure, the scope of which will be indicated in the appended claims.

Brief description of drawing

For a full understanding of the nature and objects of the present invention, reference should be had to the following detailed description, taken in connection with the accompanying drawings wherein:

FIG. 1 is an isometric view of an overhead projector embodying the present invention;

FIG. 2 is a cross-sectional view of the overhead projector of FIG. 1, taken substantially along the line 2—2;

FIGS. 3(a), (b) and (c) include exaggerated, partly cross-sectional views, of reflex reflecting components for use in accordance with the present invention;

FIG. 4 is an isometric view of a booklet embodying the present invention; and

FIG. 5 is an isometric view of another booklet embodying the present invention.

Detailed description

Generally, the overhead projector of FIGS. 1 and 2 comprises a lower platform 10, an upper casing 12 and a post 14 by which the upper casing is mounted above the lower platform. The lower extremity of post 14 is fixed within a seat 16 at an edge of platform 10. Casing 12 is adjustably fixed to post 14 by a collar 18 and by an associated tightening screw 20, which is turned through a threaded opening (not shown) in the collar under the control of a manually adjustable knob 20. The height of casing 12 above platform 10 thus may be set at will. As shown, platform 10 generally is of flat rectangular shape, the vertical dimension being much less in magnitude than either the longitudinal or the transverse dimension. Platform 10 thus may rest on a desk or the like relatively unobtrusively. Casting 12, which generally is in the form of an inverted box, is composed of a sheet metal hood 20 that is open at its lower and forward faces 22, 24.

The illuminating and imaging components of the overhead projector of FIGS. 1 and 2 are mounted on a bracket 26 and enclosed partially by hood 20. The illumination source is an incandescent filament, electric lamp 28, rearwardly of which is a curved focusing mirror 30 and forwardly of which is a pair of condensing lenses 32, 34. The imaging components include a beam splitter 36 and an objective lens 38. Beam splitter 36 has a rearward face in the form of a Fresnel prism 40 by which horizontal collimated rays from source 28 are redirected vertically through objective lens 38 toward lower portion 10 of the housing. The conformation of Fresnel prism 40 is such as to include a multiplicity of mirror facets at an angle at 45° with respect to the axis of condensing lens 32, 34, and a multiplicity of horizontal facets which are optically clear. The forward face 42 of beam splitter 36 is provided with a thin film of alternately high and low dielectric strata that efficiently transmit the collimated light to the subject from source 28 and reflect collimated light from the subject to a viewing screen.

Platform 10 is provided with an upper panel 44, a lower panel 46, a rear panel 48, a forward panel 50, a right panel 52 and a left panel 54. Mounted for reciprocal vertical movement within lower casing 10 is a support 56. Upper panel 44 has a cut-out 62 which extends from a rim 58 at the right through an edge 60 at the left. Left panel 54 is provided with a cut-out 64 which is a continuation of cut-out 62. It will be observed that a stack 66 of sheets or pages, when placed upon support 56 is capable of overlapping edge 60 and at the same time is capable of permitting support 56 to be depressed into platform 10. Upward movement of support 56 is effected under the bias of a suitable leaf spring 68 and is limited by flanges 70, 72, which abut against the underside of upper panel 44 at forward and rearward edges of cut-out 62. A pivotal retainer 74 at the rearward edge of cut-out 62 is movable between an opened position which permits support 56 to move into its uppermost position (notwithstanding the presence of stack 66 thereon) and a closed position which forces the uppermost face of stack 66 into the focal plane of objective lens 38 (against the bias of spring 68). The parallelism of support 56 is maintained by pairs of links 76, 78 at opposite edges of support 56.

As shown in FIG. 2, stack of sheets 66 is in the form of a booklet, one of the edges of which is gummed as at 80 in order to permit maintenance of the sheets in a block until used but to permit separation of the sheets one-by-one from the block during use. Preferred forms of the sheets of stack 66 are shown in FIG. 3. FIG. 3(a) shows a paper substrate 82, on opposite faces of which are reflective metallic coatings 84, 86. On the outer faces of metallic coatings 84, 86 are strata 88, 90 of refracting microspheres. At the outer faces of microsphere strata 88, 90 are suitable imprints 92, 94 of pencil, crayon or ink. An alternative structure is shown in FIG. 3(b) as incorporating a microsphere stratum 96 directly upon a base stratum 98, microsphere stratum 96 including microspheres, the surface of each of which hemispherically is optically clear and hemispherically is coated with an inner metallic reflector and an outer pigment. In FIG. 3(b), the half-coated microspheres may be deposited as a result of electrostatic attraction, which may be generated in paper substrate 98 by any suitable means. Such reflex reflecting strata are disclosed in: U.S. Patent No. 2,997,403, issued Aug. 22, 1961 in the name of Charles E. Seright for Reflex Reflective Coating Composition; and U.S. Patent No. 2,963,378, issued Dec. 6, 1960 in the name of Philip V. Palmquist for Glass Beads Hemispherically Reflectorized With Metallic Coating and Composition Thereof. An alternative reflex reflecting sheet is shown in FIG. 3(c) as having individual fibers at 100 each having an inner coating of a metal such as aluminum or silver 102 and an outer coating of refracting microspheres. The arrangement is such that almost one hundred percent of the cross-sectional area of the sheet is provided with reflex reflecting increments. It will be understood that alternative reflex reflecting strata, for example metalized cube corners or the like, alternatively are associable with subject matter in the overhead projector of FIGS. 1 and 2.

In operation, light from source 28 is transmitted through beam splitter 36 and lens 38 to uppermost sheet 66 and is returned by the reflex reflecting elements of uppermost sheet 66 through lens 38 for reflection by beam splitter 36. In the illustrated overhead projector, a high efficiency polarizing plate 41 serves to convert a large proportion of the light to polarized form and forward face 42 of beam splitter 26 reflects or transmits depending on the polarization orientation of incident light. In addition, a quarter wave retardation plate 43 is positioned at lens 38 in order to produce and analyze circular polarization in the downwardly directed beam and the upwardly directed beam, respectively. The reversal in direction of circular polarization upon reflection at uppermost sheet 66, which is non-depolarizing, enables efficient reflection by the beam splitter of the light which it originally transmitted. Polarizer 41 may have any of a variety of compositions, one such composition being described in U.S. Patent No. 3,213,753, issued Oct. 26, 1965 in the name of Howard G. Rogers for Multilayer Lenticular Light Polarizing Device. Casing 12 is provided with suitable vents 43 for convection cooling as shown in U.S. Patent No. 3,207,031, issued Sept. 21, 1965, to R. Boggild et al. Beam splitter is of the so-called pile-of-plates type described in U.S. Patent No. 2,403,731, issued July 9, 1946, in the name of Stephen M. MacNeille for Beam Splitter. Also, certain of sheets 66 are in the form of transparent plastic upon which notations or the like are printed or may be crayoned, such transparent sheets serving as overlaps for a variety of display purposes.

FIGS. 4 and 5 illustrate booklets embodying the present invention. The booklet of FIG. 4 is shown as comprising a series of pages, coated as in FIG. 3, and provided with a halftone picture 104 and lines of alphanumeric print 106. The pages are bound together by a spiral wire 108, which is threaded through a series of holes 110 in the pages. FIG. 5 illustrates a book having pages 112, coated as in FIGS. 3(a), (b) or (c), which are imprinted with pictures and characters, analogous to picture 104 and characters 106 of FIG. 4. The book of FIG. 5, which is sewn and bound at 108 and has a hard cover at 110, to all appearances is an ordinary book capable of being stacked on the shelf of a conventional library.

Conclusion

The present invention thus provides a variety of overhead projection devices and products by which opaque or transparent subject matter may be brightly imaged. Since certain changes may be made in the foregoing disclosure without departing from the scope of the invention herein, it is intended that all matter contained in the above description or shown in the accompanying drawings be interpreted in an illustrative and not in a limiting sense.

What is claimed is:

1. An overhead projector comprising generally flat, generally horizontal base means, support means upstanding from said base means, casing means positioned above and remote from said base means on said support means, illumination means in said casing means for directing a source beam of light toward a directive reflecting means at said base means, projection lens means mounted by said casing means for imaging a return beam of light from said directive reflecting means, and transmitting-reflecting means in said casing means for transmitting said source beam of light and for receiving said return beam of light substantially along a single axis, said transmitting-reflecting means deflecting said return beam of light toward a viewing screen.

2. The overhead projector of claim 1 wherein said transmitting-reflecting means is a polarizing beam splitting means.

3. The overhead projector of claim 1 wherein said directive reflecting means includes a specularly reflecting component.

4. The overhead projector of claim 1 wherein said directive reflecting means is a reflex reflecting means.

5. An overhead projector comprising generally flat, generally horizontal base means, post means upstanding from an edge of said base means, casing means positioned above and remote from said base means on said post means, illumination means in said casing means for directing a source beam of light toward said base means, projection lens means in said casing means for imaging a return beam of light on a viewing screen, transmitting-reflecting means in said casing means for transmitting said source beam of light and for receiving said return beam of light substantially along a single axis, said transmitting-reflecting means deflecting said return beam of light toward said viewing screen, directively reflective stratum means upon said base means for carrying a presentation, said directively reflective stratum means having as a component a specular reflection means, and manually operable fastening means that enables said directively reflective stratum means to be affixed readily to said base means and to be removed readily from said base means.

6. The overhead projector of claim 5 wherein said base means includes a support means movable with respect to said base means between an upper position and a lower position, and control means for locating said support means at an intermediate position depending upon the thickness of a stack of sheets thereon in order to maintain the uppermost sheet of said stack in the focal plane of said projection means.

7. An overhead projector comprising a generally flat, generally horizontal base platen, at least a post upstanding from an edge of said platen, a casing positioned above and spaced from said platen on said post, a lamp in said casing for generating illumination for said platen, a projection lens mounted by said casing for imaging illumination returned from said platen on a viewing screen, and a transmitting-reflecting means for transmitting said illumination generated by said lamp and for receiving said illumination returned from said platen along substantially a single axis, said transmitting-reflecting means deflecting said illumination returned from said platen toward said viewing screen, and a directive reflector means at said platen for bearing a representation for said imaging.

References Cited

UNITED STATES PATENTS

| | | | |
|---|---|---|---|
| 2,332,691 | 10/1943 | Blaisdell | 88—24 |
| 2,449,112 | 9/1948 | Frost | 88—26 |
| 2,661,655 | 12/1953 | Field | 88—26 |
| 2,720,136 | 10/1955 | Frank et al. | 88—24 |
| 2,963,378 | 12/1960 | Palmquist | 91—1.5 |
| 3,279,109 | 10/1966 | Whittum | 40—102 |

JOHN M. HORAN, *Primary Examiner.*

NORTON ANSHER, *Examiner.*

W. M. FRYE, *Assistant Examiner.*